United States Patent Office 2,917,374
Patented Dec. 15, 1959

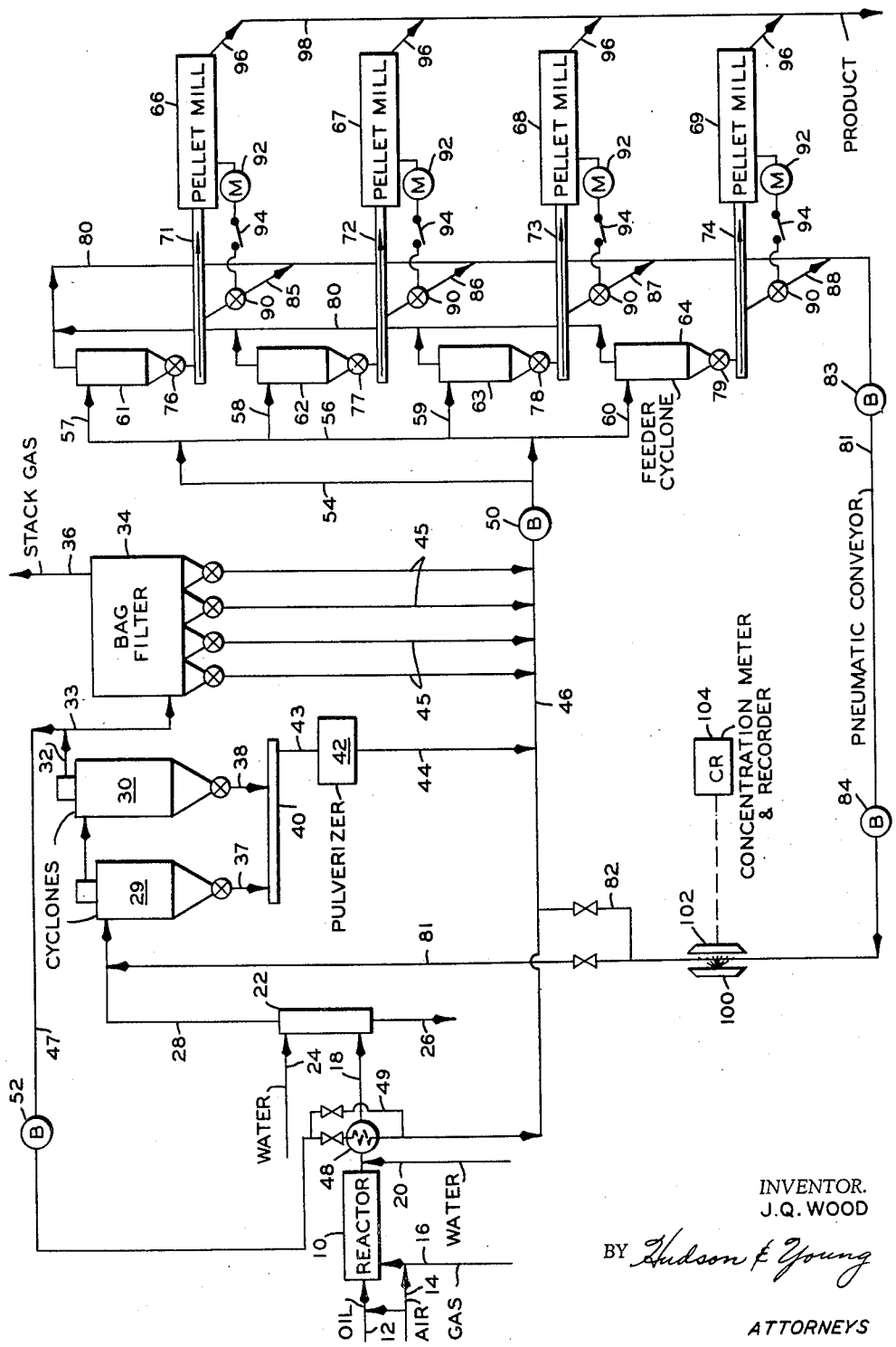

2,917,374

PROCESS AND APPARATUS FOR CARBON BLACK HANDLING AND PELLETING

James Q. Wood, Bartlesville, Okla., assignor to Phillips Petroleum Company, a corporation of Delaware Application August 26, 1957, Serial No. 680,273

6 Claims. (Cl. 23—314)

This invention relates to an improved process and apparatus for handling and pelleting powdered material such as carbon black.

In commercial carbon black production by the furnace black process the effluent gas from a series of carbon black furnaces is passed thru a collecting system, including cyclone separators and bag filters, and the recovered hot carbon black is passed from these separating devices to a screw type conveyor line which feeds the black to a series of pellet mills. Each mill is fed by a screw type conveyor which receives carbon black from a common conveyor line passing from mill to mill. In this type of system, considerable maintenance difficulties have been experienced with the mechanical conveyors and this equipment is expensive to install and to maintain. Because of the absorptive character of the carbon black, moisture accumulates in the equipment when any portion of it is shut down for maintenance repairs or because of other operational difficulties, permitting the black and equipment to cool down, and it is necessary to utilize stainless steel in the conveyor equipment which comes in contact with the carbon black. Another problem with conventional equipment lies in the extreme difficulty of accurately controlling the black feed rate to the mills. Because of the great bulk and low apparent density of the carbon black, uniform feed rates thru the individual conveyors feeding the mills are practically impossible.

It is therefore an object of the invention to provide an improved method and apparatus for handling carbon black and feeding same to pellet mills. Another object is to provide an improved method and apparatus for transferring and feeding carbon black to pellet mills at more uniform feeding rates than can be attained with current methods and apparatus. A further object is to provide an improved method and apparatus for feeding carbon black to a series of pellet mills which reduces initial plant costs, operation and maintenance expenses, and produces smoother pelleting operation and an improved product. It is also an object of the invention to provide better regulation of a carbon black pelleting process. Other objects of the invention will become apparent from a consideration of the accompanying disclosure.

In accordance with the invention, the carbon black recovered from a series of carbon black furnaces is suspended in a gaseous stream, preferably, the off-gas from the furnace black process or gaseous effluent from the recovery system. This suspension of carbon black is passed to a series of pellet mills thru a separate feeder cyclone separator and a separate feeder conveyor for each mill. In this manner, the rate of flow thru each individual pellet mill feeder system is substantially uniform.

In order to obviate the necessity of stainless steel or other corrosion resistant metal in the feeder cyclones and the conveyor equipment associated therewith, provision is made for maintaining flow of hot carbon black thru the feeder cyclones and individual feeder conveyors when the corresponding pellet mill is shut down or taken off stream. This is accomplished by providing a line from the individual feeder conveyor of each pellet mill to a common pick-up line thru which the off-gas from each of the feeder cyclones is passed. In this manner the feeding equipment for any given pellet mill is continued in service and therefore the temperature is maintained at a level which prevents condensation of moisture even though the corresponding pellet mill is not in operation.

A more complete understanding of the invention may be had by reference to the accompanying schematic drawing which is a flow diagram of a preferred embodiment of the invention. Referring to the drawing, the numeral 10 represents a series of reactors or furnaces producing carbon black according to conventional and well known furnace black processes. Oil, air, and gas are fed to the furnace thru lines 12, 14, and 16, respectively, and the gaseous effluent from the furnaces is quenched in line 18 by water injected thru line 20. A secondary water quench is effected in quench tank 22 by means of water injected thru line 24, any liquid effluent being removed thru line 26, and the cooled carbon black suspension is withdrawn thru line 28. The suspension of carbon black is passed thru a series of cyclone separators 29 and 30. Effluent gas containing a minor amount of carbon black is passed thru lines 32 and 33 to a series of bag filters 34. Clean effluent from the bag filters is vented thru stack 36.

The hot carbon black recovered from the cyclones 29 and 30 is passed thru lines 37 and 38 to a conveyor 40 which passes the black to a micro-pulverizer 42 thru line 43. The finely divided black from pulverizer 42 and from bag filters 34 is passed thru line 44 and lines 45, respectively, to a feed line 46 where the carbon black is suspended in off-gas from the black recovery system picked up from line 32 in line 47 and passed thru heat exchanger 48 in line 18. A by-pass line 49 is provided around heat exchanger 48.

Passing off-gas from cyclone 30 thru line 47 to feed line 46 as the suspending gas and subsequently returning it to the system eliminates the necessity for a separate vent filter which is required in systems where air is used as the suspending gas.

Blowers 50 and 52 in lines 46 and 47, respectively, transport the off-gas at sufficient rates to provide the desired suspension of carbon black. The gaseous carbon black suspension is transported thru lines 46 and 54 to a common feed line 56 which is connected by individual feed lines 57, 58, 59 and 60 to feeder cyclone separators 61, 62, 63, and 64, respectively. The individual feeder cyclones for each mill are connected with mills 66, 67, 68, and 69 thru individual feeder conveyors 71, 72, 73, and 74, respectively. Star valves 76, 77, 78, and 79, operated at controlled rates by conventional means (not shown) pass the black recovered in the feeder cyclones to the individual feeder conveyors. The individual feeder conveyors are preferably screw type conveyors which deliver the black at the rate received to the interior of the corresponding pellet mill.

Each feeder cyclone is connected with a common pick-up line 80 which connects with a recycle line 81 and this recycle line connects with line 46 directly thru line 82 and/or thru line 28, the primary cyclones, and line 47 for recycle of suspending gas containing entrained carbon black to feeder line 46 either directly or thru the primary cyclones or both. Blowers 83 and 84 assist in transporting the gas thru return or recycle line 81.

In order to permit continuous feeding of hot black thru the individual feeder cyclones when the corresponding pellet mill is shut down, a recycle or return system for the carbon black is provided by means of lines 85, 86, 87, and 88, each containing a feeder valve such as a star valve 90. The pellet mills are operated in conventional manner by a power source such as motor 92 and when a mill is shut down for any reason, the flow of carbon black from the corresponding feeder conveyor is recycled thru star valve 90 and the corresponding return line to pick up line 80. Star valve 90 is set into operation when motor 92 is shut off by means of switch 94 which can be electrically or mechanically operated by conventional means in response to cutting off the power source 92.

The pellet mills are of conventional design and are operated in accordance with conventional processes. These mills are usually cylindrical drums rotating with their axes horizontal and are about 6 to 8 feet in diameter and about 48 feet long. Carbon black is fed into the feed end of the mill and a bed of carbon black and pellets is maintained therein at a depth of about 12 to about 30 inches. This type of mill utilizes pellet recycle (not shown) and the pelleted black egresses from the mill thru lines 96 to a common product conveyor 98 which delivers the product pellets to packaging, storage, or transportation facilities, such as a railroad car or a ship.

The concentration of carbon black in recycle line 81 is determined by means of beta or gamma radiation source 100 which is directed thru the suspension toward absorption gauge 102 and the concentration of carbon black is metered and recorded by concentration meter and recorder 104. There is a direct relationship between the concentration of carbon black in line 81 and mill feed rates thru the individual feeder system to each mill. With any given number of mills in operation any changes in loose black feed rates to the mills which might result from a change in feed stock quality, reactor operation conditions, or in the number of furnaces on stream affects the concentration of black in line 81 which is indicated on instrument 104. When excessive feed rates to the mills are indicated, either an additional mill can be put on stream or the mill speeds or bed depths in the mills can be increased so as to compensate for the higher feed rates and bring the concentration of black in the recycle line back to the desired value. Even tho the feed rate to the individual mills changes during operation, the feed rate of black per mill obtained by this process is the same and the fluctuation in mill feed rate is more gradual and not so severe as in current loose-black handling and pelleting operation.

When relatively steady operation involves no changes in the number of reactors or mills on stream, the concentration recorder serves as a useful indicator of reactor operating conditions. If the concentration recorder reading is above normal, it is an indication of a low photelometer level on the black in the reactor effluents. Hence the concentration recorder reading can be utilized under steady operating conditions to correct adjustments in reactor operating conditions.

Certain modifications of the invention will become apparent to those skilled in the art and the illustrative details disclosed are not to be construed as imposing unnecessary limitations on the invention.

I claim:

1. A process for feeding hot carbon black to and pelleting same in a series of pellet mills which comprises passing a gaseous suspension of carbon black thru a series of cyclone separators to recover carbon black therefrom; passing effluent gas containing unrecovered black in suspension from said separators to a common pick-up line; passing carbon black from each of said separators thru a separate conveyor line to a separate pellet mill in said series and pelleting the carbon black therein; shutting down one of said mills; continuing the flow of carbon black thru the separator feeding said one mill; passing the black from the conveyor line feeding said one mill to said pick-up line; and recovering pellets of carbon black from said mills.

2. A process for pelleting carbon black which comprises passing a gaseous suspension of carbon black thru a carbon black recovery system; passing a portion of the off-gas containing unrecovered black in suspension from said recovery system thru a feed line to a series of cyclone separators connected in parallel; suspending recovered carbon black in the off-gas in said line so as to transport same to said cyclone separators; passing carbon black from each cyclone thru a separate conveyor line to a separate pellet mill and pelleting said black therein; passing off-gas containing entrained black from each of said cyclones to a common pick-up line; recycling the gas and black in said pick-up line to said feed line; regulating the rate of pelleting in response to the concentration of black in said pick-up line; and recovering resulting pellets.

3. The process of claim 2 wherein one of said mills is shut down and flow of carbon black to said mill is diverted from the conveyor feeding said mill to said pick-up line while continuing the flow of carbon black thru the cyclone feeding last said conveyor.

4. Apparatus for pelleting carbon black comprising a plurality of pellet mills; a separate conveyor line leading into each mill; a separate cyclone separator connected with each said conveyor line for delivery of solids thereto; a common feed line for a gaseous suspension of carbon black connected to each of said separators by separate lines; a common pick-up line for off-gas from said separators connected with the gas outlets thereof and with said feed line; and a return line from each said conveyor line to said pick-up line having flow control means therein.

5. The apparatus of claim 4 including a power source for operating each said mill and means for opening each said flow control valve when the power source of the corresponding mill is cut off.

6. A process for pelleting carbon black in a series of pellet mills which comprises passing a gaseous suspension of carbon black from a common feed line thru a series of cyclone separators to recover carbon black therefrom; passing effluent gas containing black in suspension from said separators to a common pick-up line; passing carbon black from each of said separators thru a separate conveyor line to a separate pellet mill in said series and pelleting the black therein; recycling the gas in said pick-up line to said feed line; determining the concentration of black in said pick-up line and regulating the rate of pelleting in said mills in response to the concentration; and recovering product pellets from said mills.

References Cited in the file of this patent

UNITED STATES PATENTS

| | | |
|---|---|---|
| 2,457,962 | Whaley | Jan. 4, 1949 |
| 2,788,267 | Larson et al. | Apr. 9, 1957 |
| 2,807,523 | Wood | Sept. 24, 1957 |
| 2,867,513 | Boyer | Jan. 6, 1959 |